United States Patent
Lee et al.

(10) Patent No.: US 11,169,891 B2
(45) Date of Patent: Nov. 9, 2021

(54) DATA PLACEMENT AND RECOVERY FOR INDIVIDUALLY CONTROLLING STORAGE DEVICE

(71) Applicants: NAVER Corporation, Seongnam-si (KR); INDUSTRY-UNIVERSITY COOPERATION FOUNDATION HANYANG UNIVERSITY ERICA CAMPUS, Ansan-si (KR)

(72) Inventors: Jaemyoun Lee, Seongnam-si (KR); Chanyoung Park, Seongnam-si (KR); Kyungtae Kang, Seongnam-si (KR); Yun-cheol Choo, Seongnam-si (KR); Sung-Won Jun, Seongnam-si (KR); Taewoong Kim, Seongnam-si (KR)

(73) Assignees: NAVER CORPORATION, Gyeonggi-Do (KR); INDUSTRY-UNIVERSITY COOPERATION FOUNDATION HANYANG UNIVERSITY ERICA CAMPUS, Gyeonggi-Do (KR)

( * ) Notice: Subject to any disclaimer, the term of this patent is extended or adjusted under 35 U.S.C. 154(b) by 563 days.

(21) Appl. No.: 16/044,919

(22) Filed: Jul. 25, 2018

(65) Prior Publication Data

US 2019/0034292 A1   Jan. 31, 2019

(30) Foreign Application Priority Data

Jul. 28, 2017   (KR) .................. 10-2017-0095891

(51) Int. Cl.
G06F 16/00 (2019.01)
G06F 11/14 (2006.01)
(Continued)

(52) U.S. Cl.
CPC ........ G06F 11/1464 (2013.01); G06F 1/3203 (2013.01); G06F 1/3221 (2013.01);
(Continued)

(58) Field of Classification Search
CPC .... G06F 11/1464; G06F 1/3221; G06F 16/27; G06F 16/182; G06F 16/185;
(Continued)

(56) References Cited

U.S. PATENT DOCUMENTS

| 9,235,500 B2 * | 1/2016 | Worthington ......... G06F 1/3275 |
| 2009/0024813 A1 * | 1/2009 | Uysal .................. G06F 11/1469 711/162 |

(Continued)

FOREIGN PATENT DOCUMENTS

| KR | 10-0925334 B1 | 11/2009 |
| KR | 10-2012-0116774 A | 10/2012 |

OTHER PUBLICATIONS

Korean Office Action dated Oct. 15, 2018 for corresponding Korean Patent Application No. 10-2017-0095891.

*Primary Examiner* — Thanh-Ha Dang
(74) *Attorney, Agent, or Firm* — Harness, Dickey & Pierce, P.L.C.

(57) ABSTRACT

Data placement and recovery technology for individually controlling a storage device includes a data management method that may achieve a power saving effect by distributing files between a portion of storage devices, for example, between storage devices included in a higher group and by limiting dependence according to a change in a state of the storage devices to be applied to a portion of storage devices to which a file distribution is performed.

17 Claims, 9 Drawing Sheets

(51) Int. Cl.
*G06F 1/3203* (2019.01)
*G06F 11/20* (2006.01)
*G06F 16/27* (2019.01)
*G06F 16/182* (2019.01)
*G06F 16/185* (2019.01)
*G06F 1/3221* (2019.01)

(52) U.S. Cl.
CPC ...... *G06F 11/1451* (2013.01); *G06F 11/2094* (2013.01); *G06F 16/182* (2019.01); *G06F 16/185* (2019.01); *G06F 16/27* (2019.01)

(58) Field of Classification Search
CPC ............... G06F 1/3203; G06F 11/1451; G06F 11/2094; Y02D 10/00
USPC ......................................................... 707/640
See application file for complete search history.

(56) References Cited

U.S. PATENT DOCUMENTS

| | | | |
|---|---|---|---|
| 2011/0276771 A1* | 11/2011 | Tajima | G06F 3/061 711/162 |
| 2012/0005440 A1* | 1/2012 | Nakao | G06F 16/185 711/162 |
| 2012/0144144 A1* | 6/2012 | Worthington | G06F 3/0604 711/165 |
| 2015/0095671 A1* | 4/2015 | Hu | G06F 1/3221 713/320 |
| 2015/0106578 A1* | 4/2015 | Warfield | G06F 3/0631 711/158 |
| 2015/0205525 A1* | 7/2015 | Chiu | G06F 3/0644 711/162 |
| 2016/0154601 A1* | 6/2016 | Chen | G06F 3/067 711/111 |

* cited by examiner

| File | Higher group | Storage device 1 | Storage device 1 |
|------|------|------|------|
| A | H1 | S1 | S4 |
| B | H2 | S7 | S10 |
| C | H3 | S13 | S16 |
| D | H1 | S1 | S5 |
| E | H2 | S7 | S11 |
| F | H3 | S13 | S17 |
| G | H1 | S1 | S6 |
| H | H2 | S7 | S12 |
| I | H3 | S13 | S18 |

DATA PLACEMENT AND RECOVERY FOR INDIVIDUALLY CONTROLLING STORAGE DEVICE

CROSS-REFERENCE TO RELATED APPLICATION(S)

This U.S. non-provisional application claims the benefit of priority under 35 U.S.C. § 119 to Korean Patent Application No. 10-2017-0095891, filed on Jul. 28, 2017, in the Korean Intellectual Property Office (KIPO), the entire contents of which are incorporated herein by reference.

BACKGROUND

Field

One or more example embodiments relate to a technology for data placement and recovery for individually controlling a storage device.

Description of Related Art

As user services, such as social networks, Internet of Things (IOT), big data, etc., are developed and data-centric services are provided, service providers need exabyte (EB) scaled data centers. However, such large amounts of data have a long tail distribution and most of the data is cold data (e.g., data that has not been used recently and/or may not be relevant). In addition, once data is saved, the saved data may not be erased due to service policy issues (e.g., guaranteed access to the data, etc.) and the amount of data being stored is constantly increasing. A storage server to store a number of exabytes requires great cost to build and operate an unprecedentedly large scale of a storage server. Accordingly, there is a need for an operation cost reduction technology from storage server technology of a data center that is focused on improving performance of the data center.

Cold data refers to data that is rarely used or accessed. For example, a read request for the cold data may occur once a year. Data may be stored to provide a service, and may need to wait to be requested to be read. It is uncertain when the read request will occur, if ever. An increase in the amount of cold data has changed the perspective of existing storage server developers and administrators. Although an enhancement in a read rate used to be a main point to be considered to provide fast service, further focus may be placed on other features, such as building high data storage capacity and lower cost storage servers and/or storage services.

A distributed file system that manages a large number of storage servers may distribute and place input files to hundreds of thousands of disks according to various data storage policies. A different policy may be used for each server operating company. Also, different performance and efficiency may be achieved based on the policy that operates differently for each service. In general, distribution policies commonly aim to place data to avoid overlap as much as possible. For example, when it is assumed that file A is duplicated and is stored in a storage device 1 and a storage device 2, file B to be subsequently stored may also be stored in the two storage devices. Here, if one is the storage device 1, data may be maximally non-overlappingly placed by using another storage device as a remaining storage device instead of using the storage device 2. Through this, it is possible to achieve a load balancing effect and to decrease the interdependence between the storage device 1 and the storage device 2. That is, it is possible to enhance the performance, the reliability, and the availability of the distributed file system by avoiding data/disk overlaps of different files being stored in the distributed file system.

In the meantime, when recovering an error in a storage device, data stored in the storage device in which the error occurs may be duplicated from other storage devices having the data and may be distributively stored in a plurality of storage devices. That is, although an error occurs in a single storage device, the plurality of storage devices may have to handle and/or cope with the error.

A method of changing a physical state of a storage device may be used to save the amount of power used by a storage server. If a state of a storage device is changed (e.g., the power saving mode, the performance mode, the on/off state, etc.), the corresponding storage device may be limited to perform an input/output (I/O) instruction since the storage device is in an I/O-disabled state to save the amount of power used by the storage device. Here, although the amount of power used may be saved, the I/O performance of the storage device may be degraded. The degradation in the I/O performance may directly lead to a service being unavailable to users.

For example, the amount of power used by a hard disk may be reduced using a spin-down technology. The spin-down technology relates to removing standby power by suspending a spindle motor for rotating a platter of the hard disk and parking the head of the hard disk. However, to execute a read/write instruction, power needs to be supplied to operate the spindle motor and the head. A rerun time may directly affect a read/write latency and may be, for example, 7 to 15 seconds.

In the meantime, when storing a file, the distributed file system may store one or two duplicates of the file. Alternatively, the distributed file system may store a fragment of the file using an erasure-coding technology. The duplicate or the fragment of the file may be stored in other storage devices. Accordingly, if a storage device storing at least one duplicate or fragment is awakened, for example, if a state of the storage device is not changed to a power saving state, the aforementioned degradation in the I/O performance may be avoided.

This policy may be very simple in that the storage device storing at least one duplicate is awakened, however, may not be readily applicable. For example, a single storage device may depend on a plurality of storage devices due to a distribution policy. That is, when a state of the single storage device is changed, a state of a disk corresponding to a significantly large amount is not to be changed, which may cause a reflexive phenomenon and a substantial power saving effect may not be achieved.

FIG. 1 illustrates an example of storing a file according to the related art. A table 100 of FIG. 1 shows nine files, e.g., files A, B, C, D, E, F, G, H, and I, that are stored in eight storage devices, e.g., storage devices S1, S2, S3, S4, S5, S6, S7, and S8, including both the original file and a duplicate file. Here, all of the disks have a dependence based on a distribution policy. For example, referring to the table 100, the original of each of the files A, B, and C are stored in the storage device S1, but the duplicates of each of the files A, B, and C are stored in other storage devices, or in other words the duplicates of files A, B, and C are not stored in the same storage device that the original files A, B, and C are stored, e.g., storage device S1. In detail, referring to the table 100, the duplicate of the file A is stored in the storage device S2, the duplicate of the file B is stored in the storage device S3, and the duplicate of the file C is stored in the storage device S4. Accordingly, as the number of files stored in the storage device S1 increases, the number of storage devices having dependence with the storage device S1 may also increase. If a state of the storage device S1 is changed, a state of all of the storage devices depending on the storage device S1 may not be changed. Also, since originals of the files E, F, G, H, and I are stored in the storage device S2 or S3, the storage devices S5, S6, S7, and S8 storing the duplicates of the files E, F, G, H, and I may have dependence with the storage device S2 or S3 and a state thereof may not be changed. Due to such a reflexive phenomenon, a general distributed file system may not change a state of many storage devices, which may lead to not achieving a substantial power saving effect and/or increasing the amount of resources consumed by the storage devices.

SUMMARY

One or more example embodiments provide a data management method, apparatus, system, and/or non-transitory computer readable medium for achieving a power saving effect by distributing files between a portion of storage devices, for example, between storage devices of a higher group, and by limiting the dependencies of the storage devices according to a change in a state of the storage devices to be applied to a portion of storage devices to which a file distribution is performed.

One or more example embodiments also provide a data management method, apparatus, system, and/or non-transitory computer readable medium that may secure the reliability of data as quickly as possible by duplicating, in parallel, data using a plurality of storage devices included in a temporarily generated lower group for recovery, even if an error occurs in a storage device.

According to an aspect of at least one example embodiment, there is provided a data management method of a computer device, the method including selecting, using at least one processor, a higher storage device group to store a file from among a plurality of higher storage device groups, the plurality of higher storage device groups each including a plurality of lower storage device groups, and each of the plurality of lower storage device groups including a plurality of storage devices; generating, using the at least one processor, at least one duplicate file by copying a file to be stored, or generating a plurality of fragments by fragmenting the file to be stored; selecting, using the at least one processor, a single storage device from among the plurality of storage devices included in a lower storage device group for each of the plurality of lower storage device groups included in the selected higher group; and distributively storing, using the at least one processor, the file to be stored and the generated at least one duplicate file, or distributively storing the file to be stored and the plurality of fragments, in the storage devices selected from the plurality of lower storage device groups associated with the selected higher storage device group.

Also, according to an aspect of at least one example embodiment, there is provided a non-transitory computer-readable recording medium storing computer readable instructions that, when executed by at least one processor, cause the at least one processor to perform the data management method in conjunction with a computer device.

Also, according to an aspect of at least one example embodiment, there is provided at least one processor configured to execute computer-readable instructions. The at least one more processor is configured to select a higher storage device group to store a file from among a plurality of higher storage device groups, the plurality of higher storage device groups each including a plurality of lower storage device groups, and each of the plurality of lower storage device groups including a plurality of storage devices, generate at least one duplicate file by copying a file to be stored or generate a plurality of fragments by fragmenting the file to be stored, select a single storage device from among the plurality of storage devices included in a lower storage device group for each of the plurality of lower storage device groups included in the selected higher storage device group, and distributively store the file to be stored and the generated at least one duplicate file, or distributively store the file to be stored and the plurality of fragments, in the storage devices selected from the plurality of lower storage device groups associated with the selected higher storage device group.

Additionally, according to an aspect of at least one example embodiment, there is provided distributed file system comprising a plurality of storage devices, and at least one processor configured to execute computer readable instructions to allocate the plurality of storage devices into a plurality of lower storage device groups, allocate the plurality of lower storage device groups into a plurality of higher storage device groups, receive a file to be stored in the distributed file system, select a higher storage device group from the plurality of higher storage device groups, the selected higher storage device group selected to store the received file, generate at least one duplicate file of the received file, select at least one storage device from each of the lower storage device groups allocated to the selected higher storage device group, and store either the received file or the at least one duplicate file in each of the selected at least one storage device from each of the lower storage device groups that are allocated to the selected higher storage device group.

According to some example embodiments, it is possible to achieve a power saving effect by distributing files between a portion of storage devices, for example, between storage devices of a higher group, and by limiting the dependencies according to a change in a state of the storage devices to be applied to a portion of storage devices to which a file distribution is performed.

Also, according to some example embodiments, although an error occurs in a storage device, it is possible to secure the reliability of data as quickly as possible by duplicating data in parallel using a plurality of storage devices included in a temporarily generated lower group for recovery.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIG. 3 illustrates an example of a table showing a result of selecting a higher group to store a file and a storage device according to at least one example embodiment;

Figure 1:
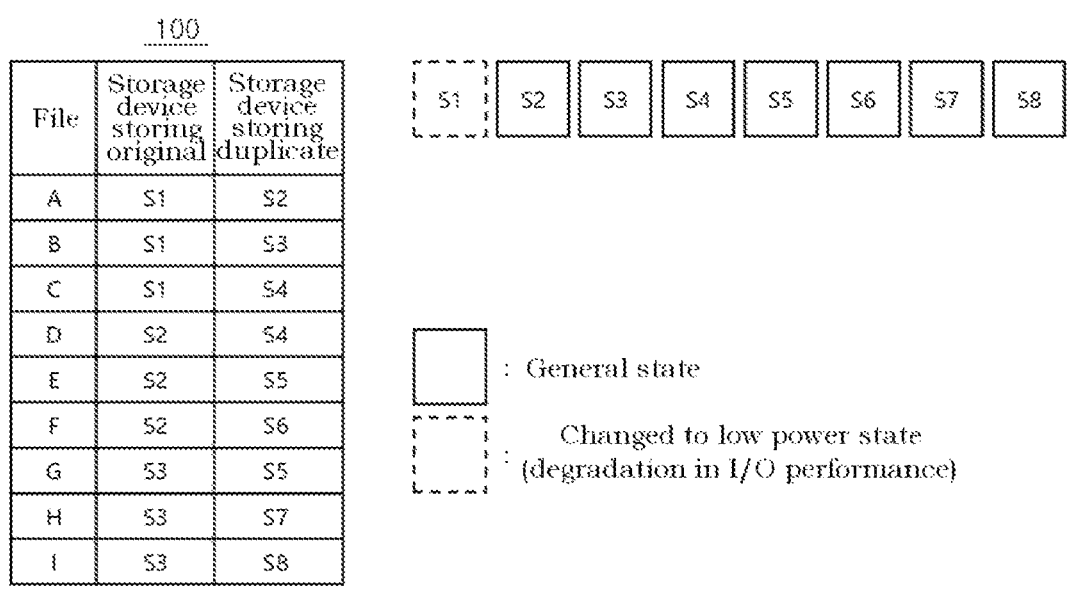
FIG. 1 illustrates an example of storing a file according to a related art.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments are conceived in that one or more distribution policies of a distributed file system need to organically operate to use a scheme of changing a state of a storage device. By performing a method according to the example embodiments, reliability may be secured and/or ensured, or increased efficiency, reliability, and/or stability may be achieved over the conventional distribution policies for distributed file systems.

One or more of the example embodiments relate to achieving a property effect of a distributed file system and a state change effect by defining at least two logical virtual groups, e.g., a higher storage device group and a lower storage device group, by classifying at least two zones, e.g., a placement zone and a state change zone, and by storing a file based on a dual distribution policy.

Here, a single higher group (e.g., a higher storage device group) may include a plurality of lower groups (e.g., a lower storage device group). A plurality of storage devices may be present within a lower group, or a single storage device may be assigned to the lower group. Each higher group may store a different file and each lower group may store the same file, including an original and a duplicate, or a fragment, for example, an erasure-coding fragment, of the same file. Also, each lower group may have a different state (e.g., power saving state, such as full power state, reduced power state, no power state, etc., performance state, etc.), and storage devices included in a single lower group may have the same state. A portion of the storage devices may not be included in any group. A number of higher groups, a number of lower groups, and a number of storage devices included in a lower group may be preset and/or assigned in real-time. The remaining storage device(s) (e.g., storage devices unassigned to a group) may be stored in a separate queue, for example, a queue in a reserved state.

Figure 2:
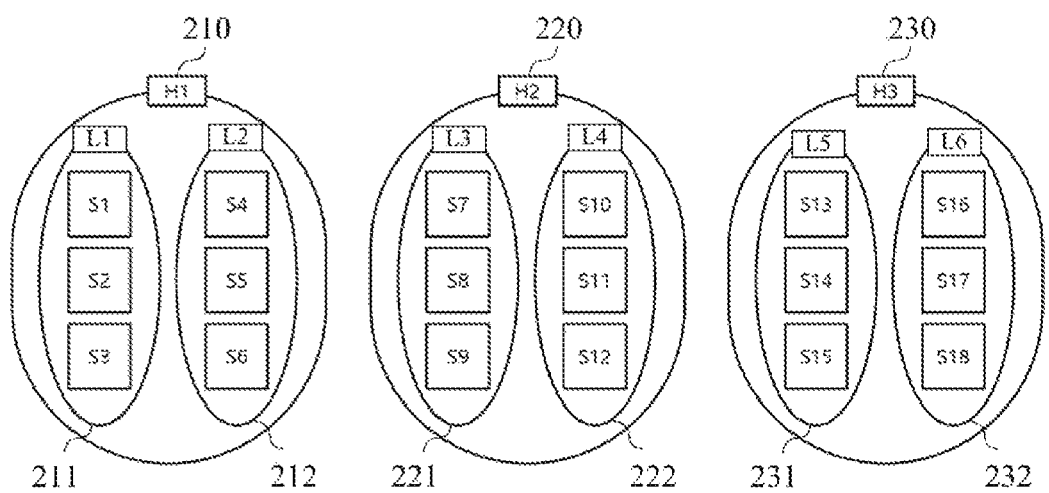
FIG. 2 illustrates an example of a higher group and a lower group according to at least one example embodiment.

FIG. 2 illustrates an example of at least one higher group and at least one lower group according to at least one example embodiment. Referring to FIG. 2, three higher groups are present and each of the three higher groups includes two lower groups, however the example embodiments are not limited thereto and the number of higher groups and the number of lower groups may be any number greater than 1. In detail, the three higher groups include a higher group H1 210, a higher group H2 220, and a higher group H3 230. The higher group H1 210 includes a lower group L1 211 and a lower group L2 212, the higher group H2 220 includes a lower group L3 221 and a lower group L4 222, and the higher group H3 230 includes a lower group L5 231 and a lower group L6 232, however the example embodiments are not limited thereto and each higher group may include any number of lower groups greater than 1. Here, each of the lower groups L1 211, L2 212, L3 221, L4 222, L5 231, and L6 232 may include three storage devices. Files may be stored in a total of 18 storage devices included in the lower groups L1 211, L2 212, L3 221, L4 222, L5 231, and L6 232, and the other remaining storage devices (not shown) may be included in at least one reserved queue. Here, a higher group and a lower group refer to logical virtual groups (e.g., logical virtual storage device groups, logical virtual disk volume groups, etc.) and thus, the physical storage devices may not be actually grouped and provided thereto. Also, a number of higher groups, a number of lower groups included in each higher group, and a number of storage devices included in each lower group may be variously set as desired, according to the example embodiments. For example, if two duplicate files are generated using a single original file, a single higher group may be set to include three lower groups to store the single original file and the two duplicate files in the different lower groups, respectively, or in other words, each of the three lower groups will respectively store one of the three files (the original file or the two duplicate files).

To store a file, a single higher group may be selected from among the existing higher groups according to a specific method. Also, a storage device to save the file may be selected from among the storage devices included in each lower group according to the specific method. This process may be applied for each lower group. If a capacity of a corresponding storage device is full, a state of storage devices included in other lower groups excluding the single full storage device from among the entire lower groups may be changed. At the same time, a new higher group may be generated using a storage device included in the reserved queue.

This structure enables files to be distributed between a portion of the total storage devices of the distributed file system, and may limit the dependencies of the storage devices according to a state change to occur only in a portion (e.g., a subset) of storage devices. Accordingly, it is possible to enhance and/or increase a power saving effect over conventional distributed file systems.

FIG. 3 illustrates an example of a table showing a result of selecting a higher group to store a file and a storage device according to at least one example embodiment. A table 300 of FIG. 3 shows higher groups and storage devices to store nine files A, B, C, D, E, F, G, H, and I. The files A, B, C, D, E, F, G, H, and I may be uniformly distributed to the higher groups as shown in the table 300. However, the example embodiments are not limited thereto, and the number of files, higher groups, and storage devices may be greater or lesser than illustrated.

Depending on the example embodiments, some files may be distributed preferentially to a specific higher group (e.g., higher priority files may be distributed to higher priority higher groups, etc.). If a higher group is preferentially selected and files are distributed to the selected higher group, a capacity of the selected higher group may become full fast and the state of the selected higher group may be quickly changed. Accordingly, it is possible to enhance the power saving effect of the example embodiments.

Figure 4:
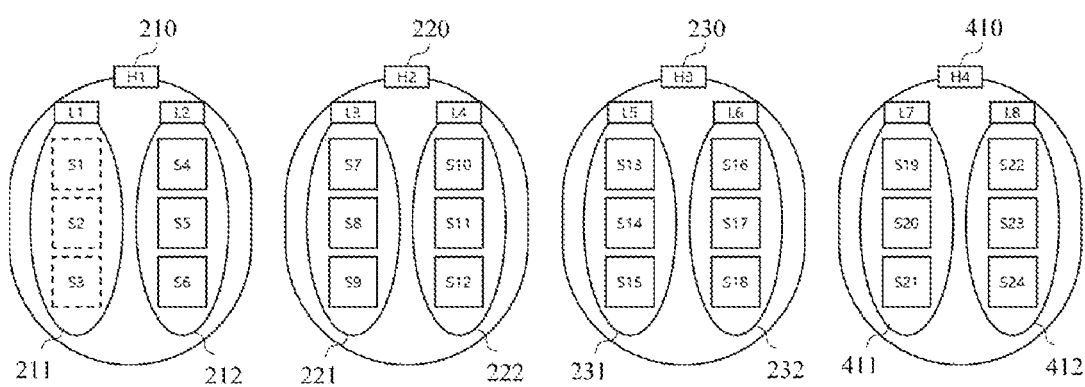
FIG. 4 illustrates an example of generating a new higher group according to at least one example embodiment.

FIG. 4 illustrates an example of generating a new higher group according to at least one example embodiment. FIG. 4 illustrates an example in which a state of a plurality of storage devices, e.g., storage devices S1, S2, and S3, etc., included in a lower group, e.g., lower group L1 211, is changed in response to a capacity of a higher group, e.g., higher group H1 210, being full. Here, although the state of the storage devices S1, S2, and S3 are changed, duplicates of a file stored in the storage devices S1, S2 and S3 are also stored in storage devices S4, S5, and S6 of the lower group L2 212. Thus, an instruction to read a file may be executed through the lower group L2 212. For example, since the capacity of the higher group H1 210 is assumed to be full, a write instruction may not be executed using the higher group H1 210. The write instruction may be executed using a newly generated higher group H4 410. The higher group H4 410 may include, for example, two lower groups, e.g., a lower group L7 411 and a lower group L8 412. Each of the lower groups L7 411 and L8 412 may also include, for example, three storage devices. The higher group H4 410 may be generated to maintain three writable higher groups in response to a change in the state of the storage devices S1, S2 and S3 of the lower group L1 211 as the capacity of the higher group H1 210 is full.

The change in the state of the group of storage devices as discussed above may be applied alike to all of the storage devices included in the same lower group. For example, in FIG. 4, the state of all of the storage devices S1, S2 and S3 corresponding to the lower group L1 211 is changed. The change in the state may indicate changing a state of a storage device to operate the storage device with low power (e.g., low power mode) as in a spin-down technology. Also, the expression "a storage device or a lower group is awakened" used herein may indicate that a storage device or storage devices included in a lower group that is normally operating, for example, are in a spin-up state, instead of operating with low power (e.g., a low power or power saving mode). Here, with respect to a single higher group with the full capacity, data, for example, a file may be read by maintaining at least one lower group associated with the higher group with full capacity to be in an awakened state.

Also, as described above, in the case of storing a fragment of a file as in an erasure-coding technology, a number of lower groups included in a single higher group may be determined based on a number of fragments of a single file. In this case, at least a desired and/or minimum number of lower groups may be maintained in an awakened state to read data according to the erase-coding technology.

As described, since an area in which files are distributively stored may be limited using the concept of an upper area, a recovery policy may vary accordingly. If an error occurs in a single storage device, a lower group for recovery may be temporarily generated using a portion of storage devices present in a reserved queue. For example, a portion (e.g., subset) of all of the storage devices may be classified and included in a plurality of higher groups, and the remaining storage devices may be managed through the reserved queue. Here, a plurality of storage devices included in the lower group for recovery may be allocated among the remaining storage devices managed through the reserved queue.

Additionally, data that is stored in a storage device in which an error occurs may be duplicated to the lower group for improvement of the data recovery process and/or data redundancy process. Also, all of the duplicated data may be duplicated to a single storage device among the storage devices of the lower group for recovery. Also, a process of duplicating all of the data duplicated to the lower group for recovery to the single storage device is referred to as "packing". Here, the recovery may be completed by replacing the storage device in which the error occurs with the packed single storage device.

By temporarily generating the lower group for recovery (e.g., a data recovery lower group) and by duplicating data to the plurality of storage devices of the data recovery lower group in parallel to duplicate the data to the lower group (e.g., data recovery lower group) as quickly as possible before packing, it is possible to recover the data stored in the storage device in which the error occurs as quickly as possible and to increase the reliability and/or guarantee the reliability of the data. That is, since the reliability of data is ensured because of the packing process, the reliability may not be degraded and/or reduced although processes are performed relatively slowly. According to one or more example embodiments, it is possible to quickly perform an error recovery operation and to improve the reliability and/or ensure a high reliability although a distribution area is limited.

Figure 5:
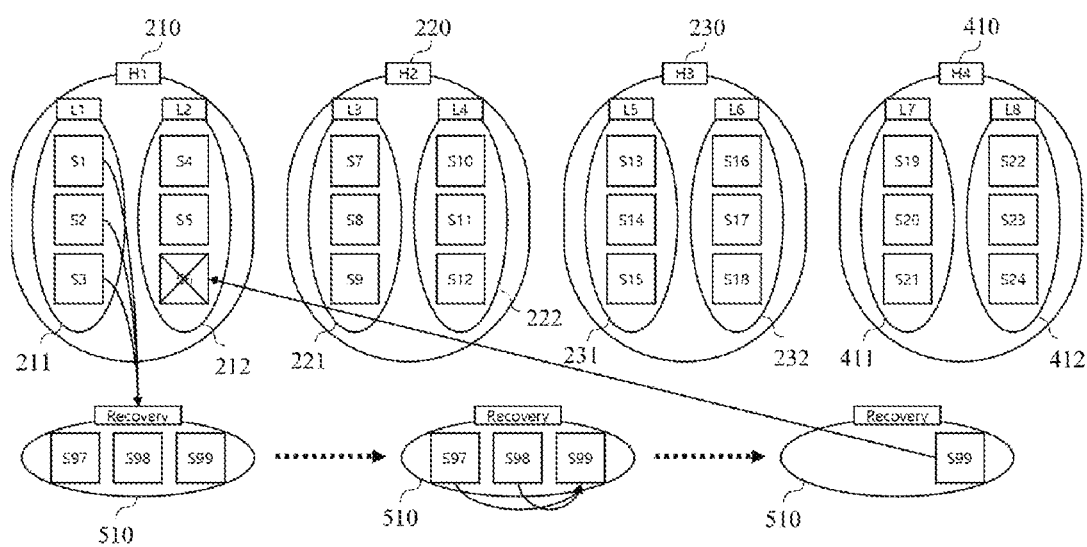
FIG. 5 illustrates an example of a process of recovering a storage device according to at least one example embodiment.

FIG. 5 illustrates an example of a process of recovering a storage device according to at least one example embodiment. Hereinafter, an example of an error recovery process in response to an error occurring in a storage device, such as the storage device S6 included in the lower group L2 212 of the higher group H1 210, is described with reference to FIG. 6.

In response to the occurrence of the error in a storage device, such as the storage device S6, a state of storage devices S1, S2, and S3 of the lower group L1 211 storing duplicates or originals of a file that is stored in the storage device S6 may be changed to enable an I/O operation (e.g., the state of the storage devices included in the lower group L1 211 may be changed to a spin-up state, etc.). Also, for example in FIG. 5, Recovery 510 is temporarily generated as a lower group for recovery (e.g., data recovery group or data recovery lower group) that includes, for example, storage devices S97, S98, and S99. Due to the occurrence of the error in the storage device S6, the duplicates or the originals of the file stored in the storage device S6 may be quickly duplicated in parallel to the storage devices S97, S98, and S99 included in the Recovery 510 through the storage devices S1, S2, and S3 of the lower group L1 211. A packing process to a single storage device, for example, the storage device S99 among the storage devices S97, S98, and S99 included in the Recovery 510 that is the lower group for recovery may be quickly performed. That is, all of the data duplicated to the storage devices S97 and S98 may be duplicated to the storage device S99 at one time. Once all the data has been duplicated to the storage device S99, the storage device S6 in which the error occurs may be replaced with the storage device S99 and the storage device S99 may inherit a role of the storage device S6.

The above data storage procedure and storage device recovery procedure may be performed by at least one computer device.

Figure 6:
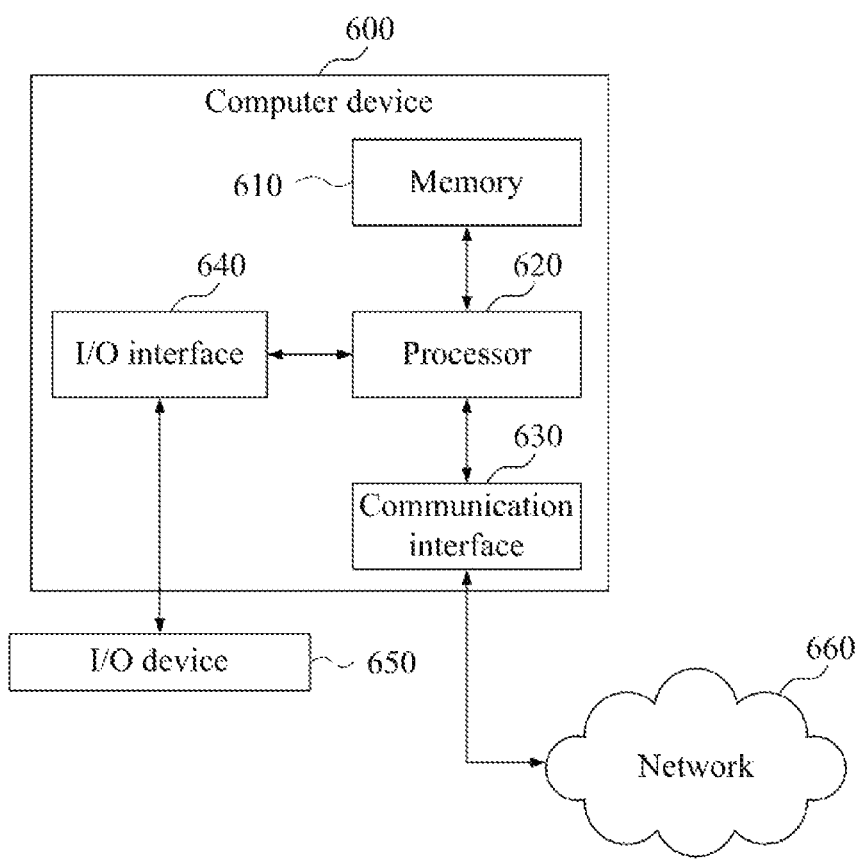
FIG. 6 is a block diagram illustrating an example of a configuration of a computer device according to at least one example embodiment.

FIG. 6 is a block diagram illustrating an example of a configuration of a computer device according to at least one example embodiment. Referring to FIG. 6, a computer device 600 may include a memory 610, at least one processor 620, a communication interface 630, and/or an I/O interface 640, but is not limited thereto. The memory 610 may include a permanent mass storage device, such as random access memory (RAM), read only memory (ROM), a disk drive, a solid state drive, a flash memory, etc., as a non-transitory computer-readable storage medium. Here, the permanent mass storage device, such as ROM and disk drive, may be included in the computer device 600 as a permanent storage device separate from the memory 610. An operating system (OS) and at least one program code may be stored in the memory 610. Such software components may be loaded from another non-transitory computer readable storage medium separate from the memory 610 to the memory 610. The other non-transitory computer-readable storage medium may include, for example, a floppy drive, a disk, a tape, a DVD/CD-ROM drive, a memory card, etc. According to other example embodiments, software components may be loaded to the memory 610 through the communication interface 630, instead of, or in addition to, the non-transitory computer-readable recording medium. For example, the software components may be loaded to the memory 610 of the computer device 600 based on a computer program installed by files received over a network 660.

The processor 620 may be configured to process computer-readable instructions of a computer program by performing basic arithmetic operations, logic operations, and I/O operations. The computer-readable instructions may be provided from the memory 610 and/or the communication interface 630 to the processor 620. For example, the processor 620 may be configured to execute received instructions in response to a program code stored in a storage device, such as the memory 610.

The communication interface 630 may provide a function for communication between the computer device 600 and another device, for example, the aforementioned storage device, over the network 660. For example, a request or an instruction generated by the processor 620 of the computer device 600 based on a program code stored in the storage device such as the memory 610, data, a file, etc., may be transferred to other devices over the network 660 under control of the communication interface 630. Inversely, a signal or an instruction, a data file, etc., from another device may be received at the computer device 600 through the network 660 and the communication interface 630 of the computer device 600. The signal or the instruction, the data, etc., received through the communication interface 630 may be stored in a storage medium, for example, the aforementioned permanent storage device, further includable in the computer device 600.

The I/O interface 640 may be a device for interface with an I/O interface 650. For example, an input device may include a keyboard, a mouse, a microphone, a camera, etc., and an output device may include a device, such as a display, a speaker, etc. As another example, the I/O interface 640 may be a device for interface with an apparatus in which an input function and an output function are integrated into a single function, such as a touchscreen. The I/O device 650 and the computer device 600 may be configured as a single device.

According to other example embodiments, the computer device 600 may further include a greater or lesser number of components than a number of components shown in FIG. 6. However, there is no need to clearly illustrate many conventional components. For example, the computer device 600 may include at least a portion of the I/O device 650 or may further include other components, such as a transceiver, a global positioning system (GPS) module, a camera, a variety of sensors, and a database.

Figure 7:
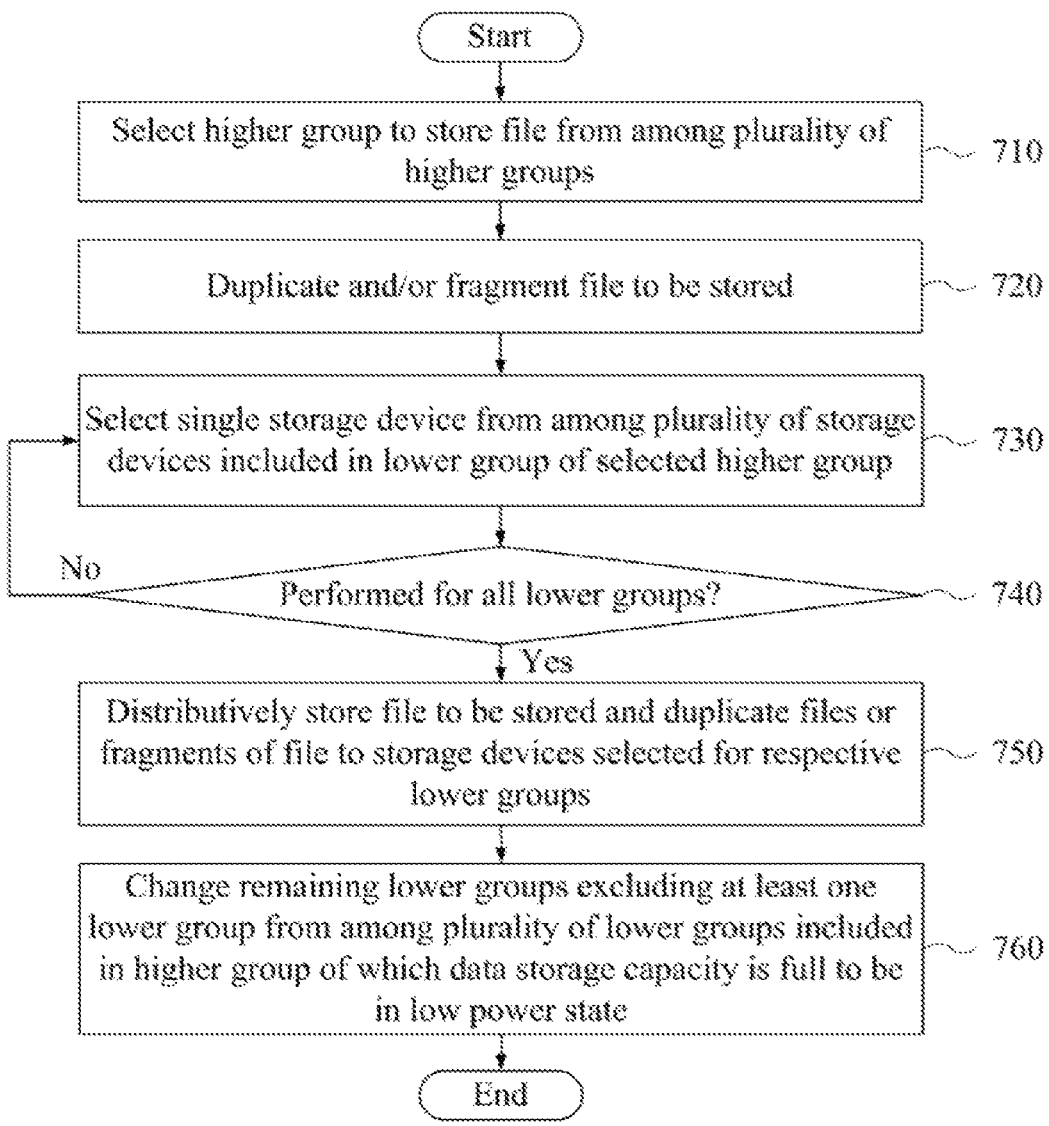
FIG. 7 is a flowchart illustrating an example of a data placement method according to at least one example embodiment.

FIG. 7 is a flowchart illustrating an example of a data placement method according to at least one example embodiment. The data placement method may be performed by the computer device 600 of FIG. 6. For example, the at least one processor 620 of the computer device 600 may be configured to execute a control instruction (e.g., a computer readable instruction) according to a code of at least one program or a code of an OS loaded to the memory 610. Here, the processor 620 may control the computer device 600 to perform operations 710 through 760 included in the data placement method of FIG. 7 in response to the control instruction.

Referring to FIG. 7, in operation 710, the computer device 600 may select a higher group to store a file from among a plurality of higher groups. Here, the plurality of higher groups may be used to classify a plurality of storage devices. For example, 18 storage devices may be classified into three higher groups, e.g., the higher groups H1 210, H2 220, and H3 230 of FIG. 2, but the example embodiments are not limited thereto. Here, the computer device 600 may select a single higher group in which a file is to be stored from among the three higher groups. A distribution method for selecting a higher group is further described with reference to FIG. 9.

In operation 720, the computer device 600 may duplicate and/or fragment the file to be stored. As described above, a distributed file system may generate at least one duplicate file of an original file, and/or may generate duplicates of the file to be stored using an erasure-coding technology, or divide the file to be stored into a plurality of fragments using the erasure-coding technology.

In operation 730, the computer device 600 may select a single storage device from among a plurality of storage devices included in a lower group of the selected higher group.

In operation 740, the computer device 600 may verify whether a single storage device is selected from each lower group of the lower groups included in the selected higher group. If the single storage device is selected from each lower group of the lower groups included in the selected higher group, operation 750 may be performed. Otherwise, operation 730 may be performed again. That is, operations 730 and 740 may be a process of selecting a single storage device for each of the lower groups included in the higher group.

In operation 750, the computer device 600 may distributively store the file to be stored, and the duplicate files and/or the fragments of the file, to storage devices selected for the respective lower groups.

As described above, a number of lower groups included in a single higher group may correspond to a sum of the original file and the duplicate files or the number of fragments of the file, but the example embodiments are not limited thereto.

In operation 760, the computer device 600 may change the remaining lower groups, excluding at least one lower group from among the plurality of lower groups included in the higher group of which data storage capacity is full, to be in a low power state. Here, the low power state may indicate a state for suspending a physical operation and/or an electrical operation of the corresponding storage devices, etc.

That is, when a single higher group has a full capacity and thus, is incapable of storing a file any more, the state of the remaining lower groups excluding at least one lower group from among the plurality of lower groups included in the higher group may be changed to the low power state, thereby saving an amount of power used (e.g., decreasing the amount of power consumed by the distributed file system).

Here, a number of at least one lower group of which a state is not changed may correspond to a desired and/or minimum number of lower groups used to make it possible to read a file stored in a corresponding higher group. For example, in the case of storing a duplicate of a file, it is possible to read a specific file stored in a higher group using only a single lower group. Thus, the states of the remaining lower groups excluding the single lower group may be changed to a low power state, thereby decreasing the amount of energy consumed by the distributed file system.

As another example, in the case of distributively storing fragments of a file to lower groups, a number of lower groups used to read a file may be preset or specified at a desired point of time. In this case, a state of remaining lower groups excluding the preset and/or specified number of lower groups may be changed to the low power state.

Figure 8:
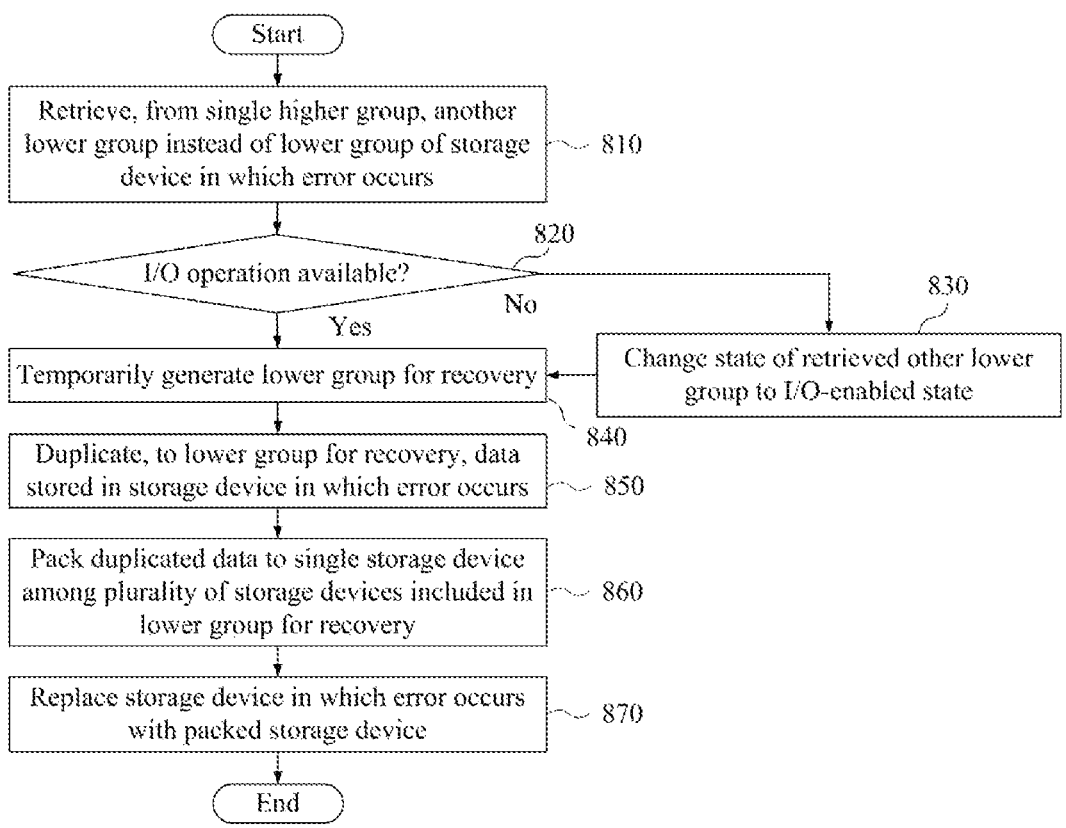
FIG. 8 is a flowchart illustrating an example of a method of recovering a storage device according to at least one example embodiment.

FIG. 8 is a flowchart illustrating an example of a method of recovering a storage device according to at least one example embodiment. The storage device recovery method may be performed by the computer device 600 of FIG. 6. For example, the at least one processor 620 of the computer device 600 may be configured to execute a control instruction (e.g., computer readable instruction) according to a code of at least one program or a code of an OS loaded to the memory 610. The processor 620 may control the computer device 600 to perform operations 810 through 870 included in the storage device recovery method of FIG. 8.

Referring to FIG. 8, in operation 810, the computer device 600 may retrieve, from a single higher group, another lower group instead of (or in place of) a lower group of a storage device in which an error occurs. As described above, the single higher group may include a plurality of lower groups and each of the plurality of lower groups may include a plurality of storage devices. For example, FIG. 5 relates to an example embodiment in which the higher group H1 210 includes the lower groups L1 211 and L2 212, the lower group L1 211 includes the storage devices S1, S2, and S3, and the lower group L2 212 includes the storage devices S4, S5, and S6, but the example embodiments are not limited thereto. Here, if an error occurs in the storage device S6, the computer device 600 may retrieve the lower group L1 211, instead of the lower group L2 212 of the storage device S6 in which the error occurs.

In operation 820, the computer device 600 may verify whether an I/O operation of the retrieved other lower group is available. For example, if the lower group is in a low power state, the I/O operation may be unavailable. Here, when the I/O operation of the retrieved other lower group is unavailable, it may indicate that at least a portion (e.g., subset) of the lower groups included in the corresponding higher group is in the low power state. For example, FIG. 4 relates to an example embodiment in which a state of the storage devices S1, S2, and S3 of the retrieved other lower group L1 211 is changed to the low power state. In this case, the computer device 600 may perform operation 830. On the contrary, if the retrieved other lower group is in an I/O-enabled state, the computer device 600 may perform operation 840.

In operation 830, the computer device 600 may change the state of the retrieved other lower group to the I/O-enabled state. The computer device 600 may change a state of a lower group of which a state is changed to the low power state to reduce an amount of power used using a spin-down technology to an original state that allows input and output of data. For example, if an error occurs in the storage device S6 of FIG. 5, the requested data and/or file may not be provided through the lower group L2 212. Accordingly, the computer device 600 may change the state of the lower group L1 211 to the I/O-enabled state to make it possible to provide the requested data and/or file. Once the state of the retrieved other lower group is changed to the I/O-enabled state in operation 830, the computer device 600 may perform operation 840.

In operation 840, the computer device 600 may temporarily generate a lower group for recovery (e.g., generate a temporary data recovery lower group). The lower group for recovery may be temporarily generated to recover the data of the storage device in which the error occurs and may be removed once the recovery is completed.

In operation 850, the computer device 600 may duplicate (e.g., copy, transfer, etc.) data stored in the storage device in which the error occurs to the lower group for recovery. For example, duplication of data may be performed through storage devices of the retrieved other lower group, instead of using the storage device in which the error occurs or the other storage devices included in the lower group that contains the storage device in which the error occurs. For example, FIG. 5 relates to an example embodiment in which an original file/data or another duplicate of the original file/data stored in the storage device S6 is duplicated to the lower group for recovery, that is, the Recovery 510 through the storage devices S1, S2, and S3 of the lower group L1 211, instead of using the storage device S6 in which the error occurs, or the lower group L2 212 that includes the storage device S6. The storage device S6 in which the error occurs may not provide data and/or the data provided from the storage device S6 may be unreliable. Also, since the original or the duplicate of data stored in the storage device S6 or fragments according to an erasure-coding technology are stored in the storage devices S1, S2, and S3 of the lower group L1 211, the data stored in the storage device S6 may be provided through the storage devices S1, S2, and S3 of the lower group L1 211.

Here, duplicating data stored in one or more storage devices, e.g., S1, S2, and S3, to one or more destination storage devices, e.g., the storage devices S97, S98, and S99, included in the recovery lower group, e.g., Recovery 510, instead of duplicating the data to a single storage device, e.g., S99, increases the reliability of the distributed file system by increasing the duplication speed by duplicating the data across multiple storage devices, increasing the reliability of the data by duplicating the data onto multiple storage devices, and/or duplicating the data of the storage device S6 as quickly as possible.

In operation 860, the computer device 600 may pack the duplicated data to a single storage device among the plurality of storage devices included in the lower group for recovery (e.g., data recovery lower group). As described above, duplicating the data of the storage device in which the error occurs allows for an increase in the reliability of the data and increase in the speed of the duplication (e.g., duplicate the data as quickly as possible) through parallel duplication. For example, to provide a storage device that replaces the storage device in which the error occurs, a packing process of collecting all of the data duplicated to a plurality of storage devices included in the lower group for recovery may be performed. An example of packing to the storage device S99 among a plurality of storage devices, e.g., the storage devices S97, S98, and S99, included in the lower group for recovery, the Recovery 510, is described with reference to FIG. 5.

In operation 870, the computer device 600 may replace the storage device in which the error occurs with the packed storage device. All of the data stored in the storage device in which the error occurs is duplicated to the packed storage device. Accordingly, the packed storage device may perform a role of the storage device in which the error occurs through the aforementioned replacement. For example, the storage device S99 is identified to be included in the lower group L2 212 of the higher group H1 210 and the replaced storage device S6 may be identified by a reserved queue.

Figure 9:
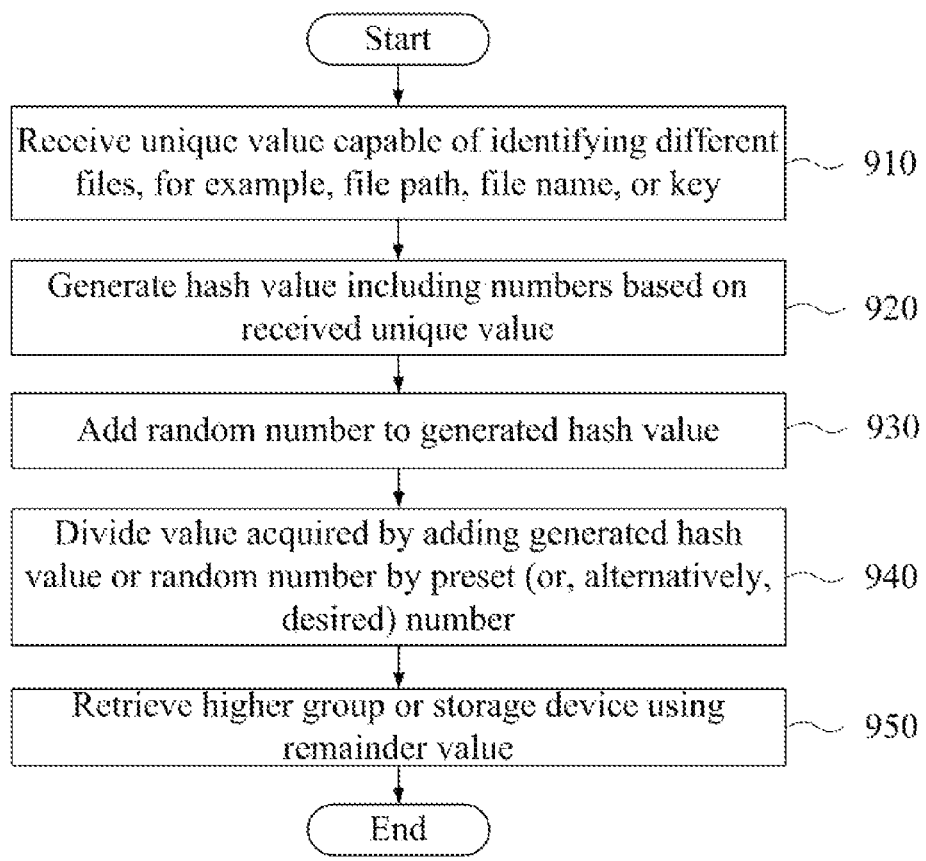
FIG. 9 is a flowchart illustrating an example of a method of executing a distribution method according to at least one example embodiment.

FIG. 9 is a flowchart illustrating an example of a method of executing a distribution method according to at least one example embodiment. A specific method regarding which storage device a file is to be stored is disclosed in the aforementioned example embodiments. As an example of the specific method, the distribution method of FIG. 9 is described, but the example embodiments are not limited thereto. The distribution method of FIG. 9 may be performed by the computer device 600 of FIG. 6. For example, the processor 620 of the computer device 600 may be configured to execute a control instruction (e.g., computer readable instruction) according to a code of at least one program or a code of an OS loaded to the memory 610. Here, the processor 620 may control the computer device 600 to perform operations 910 through 950 according to the distribution method in response to the control instruction.

Referring to FIG. 9, in operation 910, the computer device 600 may receive a unique value (e.g., unique identifier) capable of identifying different files, for example, a file path, a file name, and/or a key, etc.

In operation 920, the computer device 600 may generate a hash value including numbers based on the received unique value.

In operation 930, the computer device 600 may add a random number to the generated hash value. The random number may be used to select a storage device from each of other lower groups, for example, starting with a second lower group after a single higher group is selected and a storage device is selected from a first lower group of the selected higher group. Such random number generation is further described below.

In operation 940, the computer device 600 may divide a value acquired by adding the generated hash value or the random number by a desired (or, alternatively, preset) number. Here, the desired and/or preset number may refer to a number of higher groups or a number of storage devices included in a lower group.

In operation 950, the computer device 600 may retrieve the higher group or the storage device using a remainder value.

For example, if a hash value for a unique value of a file to be stored is 347 and a number of higher groups is 5, a remainder value is 2. Thus, a third higher group may be selected. Here, if remainder=0, it may correspond to a first higher group. If a number of storage devices included in a lower group of the third higher group is 10, a remainder value is 7 by dividing the hash value 347 by 10. Thus, an eighth storage device may be selected.

The aforementioned random number may be used to select a storage device included in a second lower group. The random number may start with 0 and a maximum value may be set to be greater than a number of storage devices included in a lower group. For example, a random number of 11 may be used to select a storage device from the second lower group. A remainder value of 8 may be acquired by dividing 358 (=hash value 347+random number 11) by 10 (=number of storage devices). In this case, a ninth storage device may be selected from the second lower group.

The distribution method is an example of distributively storing an original and/or a duplicate of a file and/or fragments of the file. However, the example embodiments are not limited thereto, and any type of methods for distributively storing a file may be used.

According to some example embodiments, it is possible to achieve and/or improve a power saving effect by distributing files between a portion (e.g., a subset) of storage devices, for example, between storage devices of a higher group, and by limiting dependence according to a change in a state of the storage devices to be applied to a portion of storage devices to which a file distribution is performed. Also, according to some example embodiments, although an error occurs in a storage device, it is possible to increase and/or secure the reliability of data by duplicating in parallel the data stored on the storage device where the error occurred by using a plurality of storage devices included in a temporarily generated lower group for recovery. Additionally, an increase in speed, including performing the duplication as quickly as possible, may be achieved by duplicating in parallel the data stored on the storage device where the error occurred.

The systems and/or devices described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A data management method for a distributed file system, the method comprising:

selecting, using at least one processor, a higher storage device group to store a file from among a plurality of higher storage device groups, the plurality of higher storage device groups each including a plurality of lower storage device groups, and each of the plurality of lower storage device groups including a plurality of storage devices;

generating, using the at least one processor, at least one duplicate file by copying a file to be stored, or generating a plurality of fragments by fragmenting the file to be stored;

selecting, using the at least one processor, a single storage device from among the plurality of storage devices included in a lower storage device group for each of the plurality of lower storage device groups included in the selected higher storage device group;

distributively storing, using the at least one processor, the file to be stored and the generated at least one duplicate file, or distributively storing the file to be stored and the plurality of fragments, in the storage devices selected from the plurality of lower storage device groups associated with the selected higher storage device group;

generating, using the at least one processor, a data recovery lower storage device group in response to an occurrence of an error in at least one storage device of the plurality of storage devices; and duplicating in parallel, using the at least one processor, data stored in the storage device with the error to a plurality of storage devices included in the generated data recovery lower storage device group using storage devices of another lower storage device group included in the same higher storage device group instead of using a lower storage device group that includes the storage device with the error.

2. The method of claim 1, wherein a number of the plurality of lower groups included in the selected higher group corresponds to a sum of the file to be stored and a number of the generated at least one duplicate file or a number of the plurality of fragments.

3. The method of claim 1, further comprising: changing, using the at least one processor, a power state of the remaining lower storage device groups of the plurality of lower storage device groups included in the selected higher storage device group to be in a low power state, except for at least one lower storage device group whose data storage capacity is full.

4. The method of claim 3, wherein the low power state includes a state for suspending a physical operation or suspending an electrical operation of the plurality of storage devices included in the remaining lower storage device groups.

5. The method of claim 3, wherein a number of the at least one lower storage device group corresponds to a minimum number of lower storage device groups used to read a file assigned to a higher storage device group whose data storage capacity is full.

6. The method of claim 1, further comprising:
managing, using the at least one processor, at least one storage device that has not been allocated to one of the plurality of higher storage device groups using a reserved queue; and
allocating, using the at least one processor, the plurality of storage devices included in the data recovery lower storage device group to the reserved queue.

7. The method of claim 1, further comprising:
verifying, using the at least one processor, a state of the storage devices of the other lower storage device groups included in the selected higher storage device group; and
recovering, using the at least one processor, the state of the storage devices of the other lower storage device group to be an input/output-enabled state in response to the state of the storage devices of the lower storage device group being verified to be a low power state.

8. The method of claim 1, further comprising:
packing, using the at least one processor, the parallel-duplicated data to a single storage device among the plurality of storage devices included in the data recovery lower storage device group; and
replacing, using the at least one processor, the storage device with the error with the packed single storage device.

9. A non-transitory computer-readable recording medium storing computer readable instructions that, when executed by at least one processor, cause the at least one processor to perform the data management method of claim 1.

10. A computer device comprising:
at least one processor configured to execute computer-readable instructions to,
select a higher storage device group to store a file from among a plurality of higher storage device groups, the plurality of higher storage device groups each including a plurality of lower storage device groups, and each of the plurality of lower storage device groups including a plurality of storage devices;
generate at least one duplicate file by copying a file to be stored or generate a plurality of fragments by fragmenting the file to be stored;
select a single storage device from among the plurality of storage devices included in a lower storage device group for each of the plurality of lower storage device groups included in the selected higher storage device group;
distributively store the file to be stored and the generated at least one duplicate file, or distributively store the file to be stored and the plurality of fragments, in the storage devices selected from the plurality of lower storage device groups associated with the selected higher storage device group;
generate a data recovery lower storage device group in response to an occurrence of an error in at least one storage device of the plurality of storage devices; and
duplicate in parallel data stored in the storage device with the error to a plurality of storage devices included in the generated data recovery lower storage device group through storage devices of another lower storage device group included in the same higher storage device group instead of using a lower storage device group that includes the storage device with the error.

11. The computer device of claim 10, wherein a number of the plurality of lower storage device groups included in the selected higher storage device group corresponds to a sum of the file to be stored and a number of the generated at least one duplicate file or a number of the plurality of fragments.

12. The computer device of claim 10, wherein the at least one processor is configured to: change a power state of the remaining lower storage device groups of the plurality of lower storage device groups included in the selected higher storage device group to be in a low power state, except for at least one lower storage device group whose data storage capacity is full.

13. The computer device of claim 10, wherein the at least one processor is configured to:
verify a state of the storage devices of the other lower storage device groups included in the selected higher storage device group; and
recover the state of the storage devices of the other lower storage device group to be an input/output-enabled state in response to the state of the storage devices of the lower storage device group being verified to be a low power state.

14. The computer device of claim 10, wherein the at least one processor is configured to:
pack the parallel-duplicated data to a single storage device among the plurality of storage devices included in the data recovery lower storage device group; and
replace the storage device with the error with the packed single storage device.

15. A distributed file system comprising:
a plurality of storage devices; and
at least one processor configured to execute computer readable instructions to,
allocate the plurality of storage devices into a plurality of lower storage device groups;
allocate the plurality of lower storage device groups into a plurality of higher storage device groups;
receive a file to be stored in the distributed file system;

select a higher storage device group from the plurality of higher storage device groups, the selected higher storage device group selected to store the received file;
generate at least one duplicate file of the received file;
select at least one storage device from each of the lower storage device groups allocated to the selected higher storage device group;
store either the received file or the at least one duplicate file in each of the selected at least one storage device from each of the lower storage device groups that are allocated to the selected higher storage device group;
generate a data recovery lower storage device group in response to an occurrence of an error in at least one storage device of the plurality of storage devices, the data recovery lower storage device group including a plurality of storage devices; and
duplicate in parallel data stored in the at least one storage device with the error onto the plurality of storage devices included in the data recovery lower storage device group.

16. The distributed file system of claim 15, wherein the at least one processor is further configured to:

determine a data capacity status for each of the storage devices included in each of the lower storage device groups allocated to the selected higher storage device group;
determine a current power state for each of the storage devices included in each of the lower storage device groups allocated to the selected higher storage device group; and
change the power state of each of the storage devices included in each of the lower storage device groups allocated to the selected higher storage device group based on results of the determining the data capacity status and results of the determining the current power state.

17. The distributed file system of claim 15, wherein the at least one processor is further configured to:

allocate storage devices that have not been allocated to a higher storage device group to a reserved queue; and
replace a storage device with data errors with one of the storage devices included in the reserved queue.

* * * * *